US008626631B2

(12) United States Patent
Tompkins (10) Patent No.: US 8,626,631 B2
(45) Date of Patent: Jan. 7, 2014

(54) ADAPTIVE CLOSED LOOP INVESTMENT DECISION ENGINE

(75) Inventor: Neal Tompkins, Melbourne Beach, FL (US)

(73) Assignee: Harbor East Associates, LLC, Melbourne Beach, FL (US)

( * ) Notice: Subject to any disclaimer, the term of this patent is extended or adjusted under 35 U.S.C. 154(b) by 98 days.

(21) Appl. No.: 13/115,793

(22) Filed: May 25, 2011

(65) Prior Publication Data

US 2011/0295766 A1 Dec. 1, 2011

Related U.S. Application Data

(60) Provisional application No. 61/348,171, filed on May 25, 2010.

(51) Int. Cl.
*G06Q 40/00* (2012.01)

(52) U.S. Cl.
USPC .......................................... 705/36 R; 705/35

(58) Field of Classification Search
USPC ........................................................ 705/36 R
See application file for complete search history.

(56) References Cited

U.S. PATENT DOCUMENTS

| | | | | |
|---|---|---|---|---|
| 6,141,653 | A * | 10/2000 | Conklin et al. | 705/80 |
| 6,173,276 | B1 * | 1/2001 | Kant et al. | 706/50 |
| 6,292,787 | B1 * | 9/2001 | Scott et al. | 705/36 R |
| 6,493,682 | B1 * | 12/2002 | Horrigan et al. | 705/36 R |
| 6,834,811 | B1 * | 12/2004 | Huberman et al. | 236/49.3 |
| 6,954,931 | B2 * | 10/2005 | Shetty et al. | 718/104 |
| 6,983,257 | B2 * | 1/2006 | Gatto | 705/36 R |
| 7,016,870 | B1 * | 3/2006 | Jones et al. | 705/35 |
| 7,062,458 | B2 * | 6/2006 | Maggioncalda et al. | 705/36 R |
| 7,103,580 | B1 * | 9/2006 | Batachia et al. | 705/80 |
| 7,149,716 | B2 * | 12/2006 | Gatto | 705/36 R |
| 7,249,081 | B2 * | 7/2007 | Shearer et al. | 705/36 R |
| 7,321,871 | B2 * | 1/2008 | Scott et al. | 705/36 R |
| 7,493,280 | B2 * | 2/2009 | Guler et al. | 705/37 |
| 7,636,680 | B2 * | 12/2009 | Gatto | 705/36 R |
| 7,698,248 | B2 * | 4/2010 | Olson | 706/56 |
| 7,702,556 | B2 * | 4/2010 | Charnley, Jr. | 705/36 R |

(Continued)

*Primary Examiner* — Kirsten Apple
(74) *Attorney, Agent, or Firm* — Howison & Arnott, L.L.P.

(57) ABSTRACT

An adaptive closed loop decision engine outputs actionable alerts regarding asset holdings and allocations to reduce investment volatility and improve returns over market and sector cycles without unnecessary trading activity. The decision engine performs a statistical analysis on pricing trends that generates threshold decision points for investing in or avoiding assets and for determining asset allocation weightings within a portfolio. The engine operates in a way that yields higher returns, dramatically reduces maximum drawdown and lower volatility over market cycles. It identifies conditional probabilities, when they exist, to establish decision parameters that are applied to individual investment vehicles or to portfolios of investments. If asset pricing were a purely random event, then no conditional probability advantage would exist to yield a statistical benefit. However, historical data and empirical evidence indicate that for broad market indices and many investable assets (e.g., funds and ETFs) pricing variability deviates from a purely random (Gaussian) nature. Specifically, some trends have a higher probability of continuing for some period of time. Furthermore, these conditional relationships can be detected and used to establish decision parameters that can improve asset returns and lower volatility over single and multiple market corrections. Any conditional relationship that has existed in the past may not continue into the future and this invention is able to detect if those relationships are changing and adapt to those changes. The recent market turbulence has highlighted the need to have a well-developed statistical model of the market and an adaptive tool to deal objectively with such volatile situations.

9 Claims, 10 Drawing Sheets

(56) References Cited

U.S. PATENT DOCUMENTS

| | | | |
|---|---|---|---|
| 7,774,257 B2* | 8/2010 | Maggioncalda et al. | 705/36 R |
| 7,778,856 B2* | 8/2010 | Reynolds et al. | 705/7.28 |
| 7,788,155 B2* | 8/2010 | Jones et al. | 705/36 R |
| 7,788,205 B2* | 8/2010 | Chalasani et al. | 706/48 |
| 7,813,527 B2* | 10/2010 | Wang | 382/103 |
| 7,813,989 B2* | 10/2010 | Jones et al. | 705/36 R |
| 2002/0002521 A1* | 1/2002 | Shearer et al. | 705/36 |
| 2002/0138386 A1* | 9/2002 | Maggioncalda et al. | 705/36 |
| 2002/0165814 A1* | 11/2002 | Lee et al. | 705/37 |
| 2003/0014293 A1* | 1/2003 | Shetty et al. | 705/8 |
| 2003/0078867 A1* | 4/2003 | Scott et al. | 705/36 |
| 2003/0172018 A1* | 9/2003 | Chen et al. | 705/36 |
| 2003/0182224 A1* | 9/2003 | Horrigan et al. | 705/37 |
| 2004/0054610 A1* | 3/2004 | Amstutz et al. | 705/36 |
| 2004/0103013 A1* | 5/2004 | Jameson | 705/7 |
| 2004/0111308 A1* | 6/2004 | Yakov | 705/8 |
| 2004/0111350 A1* | 6/2004 | Charnley, Jr. | 705/36 |
| 2004/0133526 A1* | 7/2004 | Shmueli et al. | 705/80 |
| 2004/0260645 A1* | 12/2004 | Yakos | 705/39 |
| 2005/0065808 A1* | 3/2005 | Faltings | 705/1 |
| 2005/0080704 A1* | 4/2005 | Erlach et al. | 705/36 |
| 2005/0144064 A1* | 6/2005 | Calabria et al. | 705/14 |
| 2007/0050274 A1* | 3/2007 | Rogatz | 705/35 |
| 2009/0006226 A1* | 1/2009 | Crowder | 705/30 |
| 2009/0018969 A1* | 1/2009 | Ayres et al. | 705/36 R |
| 2011/0295766 A1* | 12/2011 | Tompkins | 705/36 R |
| 2013/0024396 A1* | 1/2013 | Wilhelm et al. | 705/36 R |
| 2013/0041804 A1* | 2/2013 | Glinberg et al. | 705/37 |

* cited by examiner

| RANGE | 12 MONTH RETURNS |
|-------|------------------|
| 1 | 60% |
| 2 | 50% |
| 3 | 40% |
| 4 | 30% |
| 5 | 20% |
| 6 | 15% |
| 7 | 10% |
| 8 | 5% |
| 9 | 0% |
| 10 | -5% |
| 11 | -10% |
| 12 | -15% |
| 13 | -20% |
| 14 | -30% |
| 15 | -40% |
| 16 | -50% |

| Asset Value on | Current Day (most recent day of valid closing data), Tc | | |
|---|---|---|---|
| | V>Stu | Stu≤V≤Stl | V<Stl |
| Prior Day, Tc-1  V>Stu | in | out | out |
| Stu≤V≤Stl | in | in | out |
| V<Stl | in | in | out |

|  | VTI | VEU | BND | PRPFX | VHCOX | VWO | TDF | MINDX |
|---|---|---|---|---|---|---|---|---|
| VTI | — | VEU | BND | PRPFX | VHCOX | VWO | TDF | MINDX |
| VEU | VEU | — | BND | PRPFX | VHCOX | VWO | TDF | MINDX |
| BND | BND | BND | — | PRPFX | VHCOX | VWO | TDF | MINDX |
| PRPFX | PRPFX | PRPFX | PRPFX | — | VHCOX | VWO | TDF | MINDX |
| VHCOX | VHCOX | VHCOX | VHCOX | VHCOX | — | VWO | TDF | MINDX |
| VWO | VWO | VWO | VWO | VWO | VWO | — | TDF | MINDX |
| TDF | TDF | TDF | TDF | TDF | TDF | TDF | — | MINDX |
| MINDX | MINDX | MINDX | MINDX | MINDX | MINDX | MINDX | MINDX | — |

| COLOR CODE | <10% BENEFIT | 10 TO 20% BENEFIT | 20 TO 40% BENEFIT | >40% BENEFIT |
|---|---|---|---|---|

FIG. 14

ADAPTIVE CLOSED LOOP INVESTMENT DECISION ENGINE

CROSS-REFERENCE TO RELATED APPLICATIONS

This application claims benefit of U.S. Provisional Application No. 61/348,171, filed May 25, 2010, and entitled ADAPTIVE CLOSED LOOP INVESTMENT DECISION ENGINE.

TECHNICAL FIELD

The present invention relates to a system and method for an adaptive closed loop investment decision engine adapted to provide actionable alerts regarding asset holdings, typically publically traded stocks, and allocations of such assets to reduce investment volatility and improve returns over market and sector cycles without unnecessary trading activity.

BACKGROUND

The Search for Objective Insight

The recent worldwide market correction and increased volatility has emphasized the need investors have for guidance. The perennial questions of when to buy or sell and what proportion an asset should hold in a portfolio are the topics of countless articles, opinions and theories. Investment advisors and analysts offer these services for sizeable fees. But in the final analysis most investment models are privately held processes, with little or no transparency. Or they are simply intuitive suggestions based on personal experience. From common financial rules of thumb to actively managed and exotic private funds there is a notable lack of critical comparative data, theoretical foundation or statistical evidence if an investment methodology is effective or when it is effective. There are numerous trading platforms that have emerged in recent decades that are easily accessible to the average investor with web access. However, these tools tend to focus on active trading of single assets. What the investor needs is an easily used toolset that is transparent, has demonstrable effectiveness and focuses on a methodology that targets modest trading activity, reduced volatility, smaller draw-downs and enhanced returns across market corrections.

The Near Random Nature of the Market

There is well documented empirical evidence that the broad market deviates from a purely random pricing variable. Jeremy Siegel, in his book, "Stocks for the Long Run", presents well known data that indicates long term market performance deviates from a purely random variable as evidenced by the shrinking volatility (square root relationship of the standard deviation is violated) of bonds and stocks as the time frame expands over years and decades. This is attributed to the mean regressing nature of the market. There are other long term statistical models such as Eliot wave theories that ascribe market pricing behavior to multiple interacting cycles of fundamental market drivers. And there are shorter term trading models such as the 200 day moving average methodology that can take advantage of shorter term trends if one can tolerate the trading volume, false positive over and back trades and slippage constraints. There is scant theoretical foundation for these trading approaches and they are mostly predicated on the empirical tests that seem to indicate they have been successful in the past, given the constraints mentioned above.

The Market as a Gamble

The apparent randomness of the market appears in many ways to make it a gamble. However, there are fundamental and statistical relationships that may tilt the odds slightly in favor of the investor, not unlike counting cards. But any method must uncover and monitor those relationships in real time if they are to be used to advantage.

Mean Reversion

Figure 1:
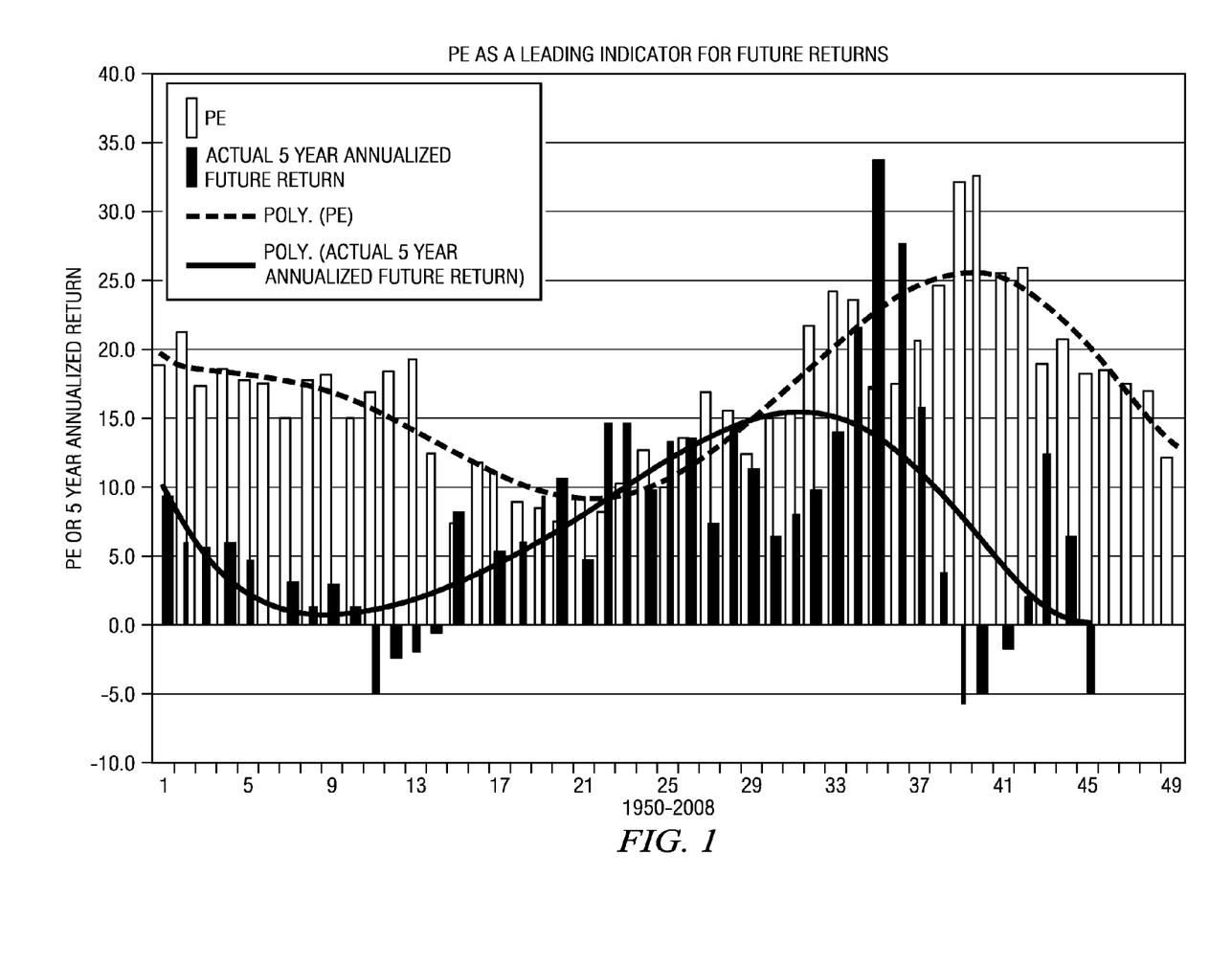
FIG. 1 is a graph illustrating PE as a leading indicator of further returns.

Empirical and historical evidence implies that the market is mean reverting. Price to earnings ratios (PE) have been a fundamental tool of the financial analyst to predict future returns. And over a long enough time horizon of perhaps 5 or 10 years or longer, this apparent relationship can benefit the investor greatly. However, over shorter time horizons of weeks, months or a few years this is a poor predictor of returns where near term market volatility can hide the longer term relationships. This can be seen in FIG. 1 which shows PE as a leading indicator of further returns and in FIG. 2, a scatter plot of PE as a predictor of future returns.

Figure 2:
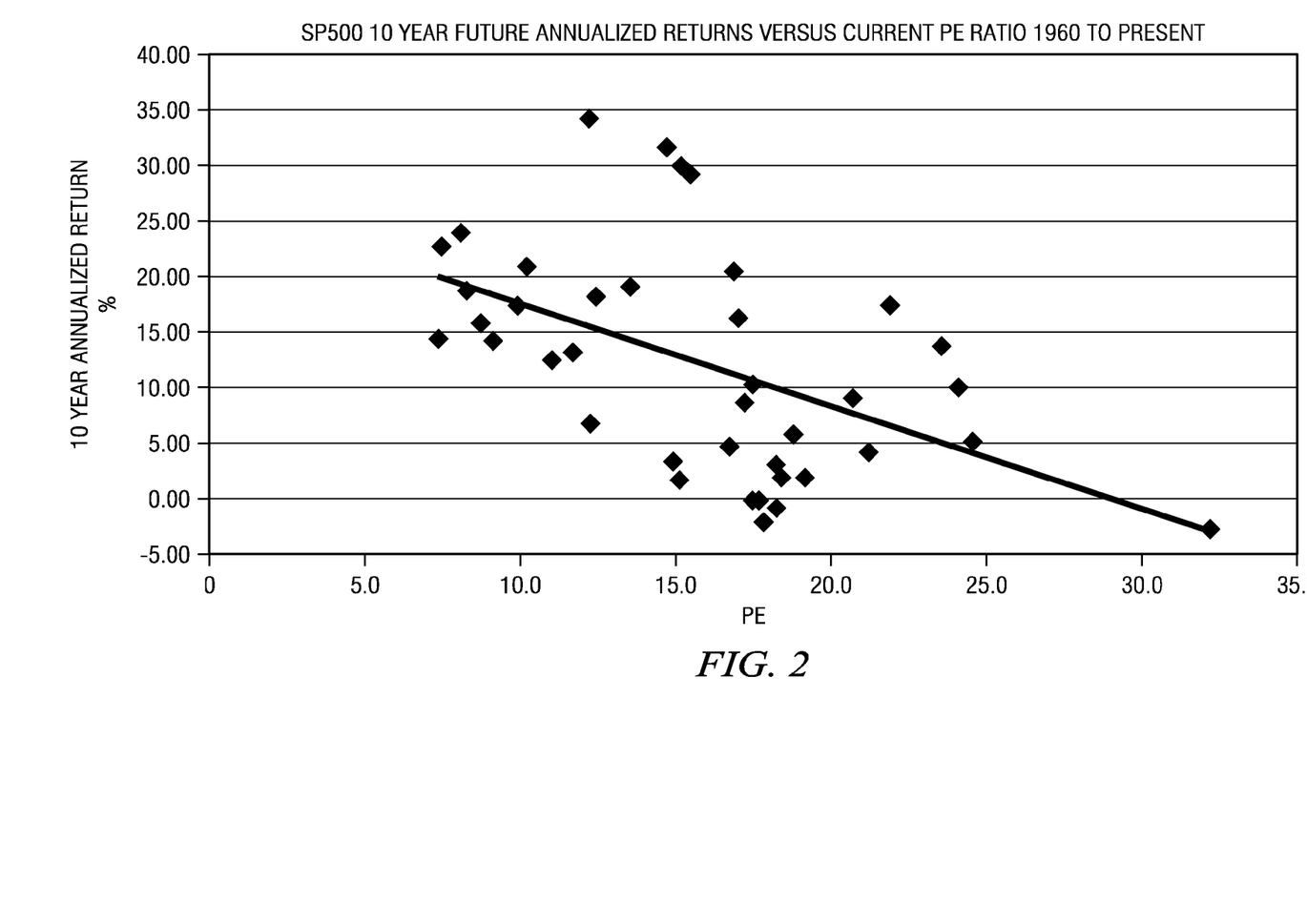
FIG. 2 is a scatter plot of PE as a predictor of future returns.

Referring to FIG. 2, another way to illustrate this relationship, with a clearer view into its predictive nature, is to look at a scatter plot of the future returns of a market with respect to an underling metric, in this case PE, and with a linear fit the trend superimposed on the noise becomes apparent.

Figure 3:
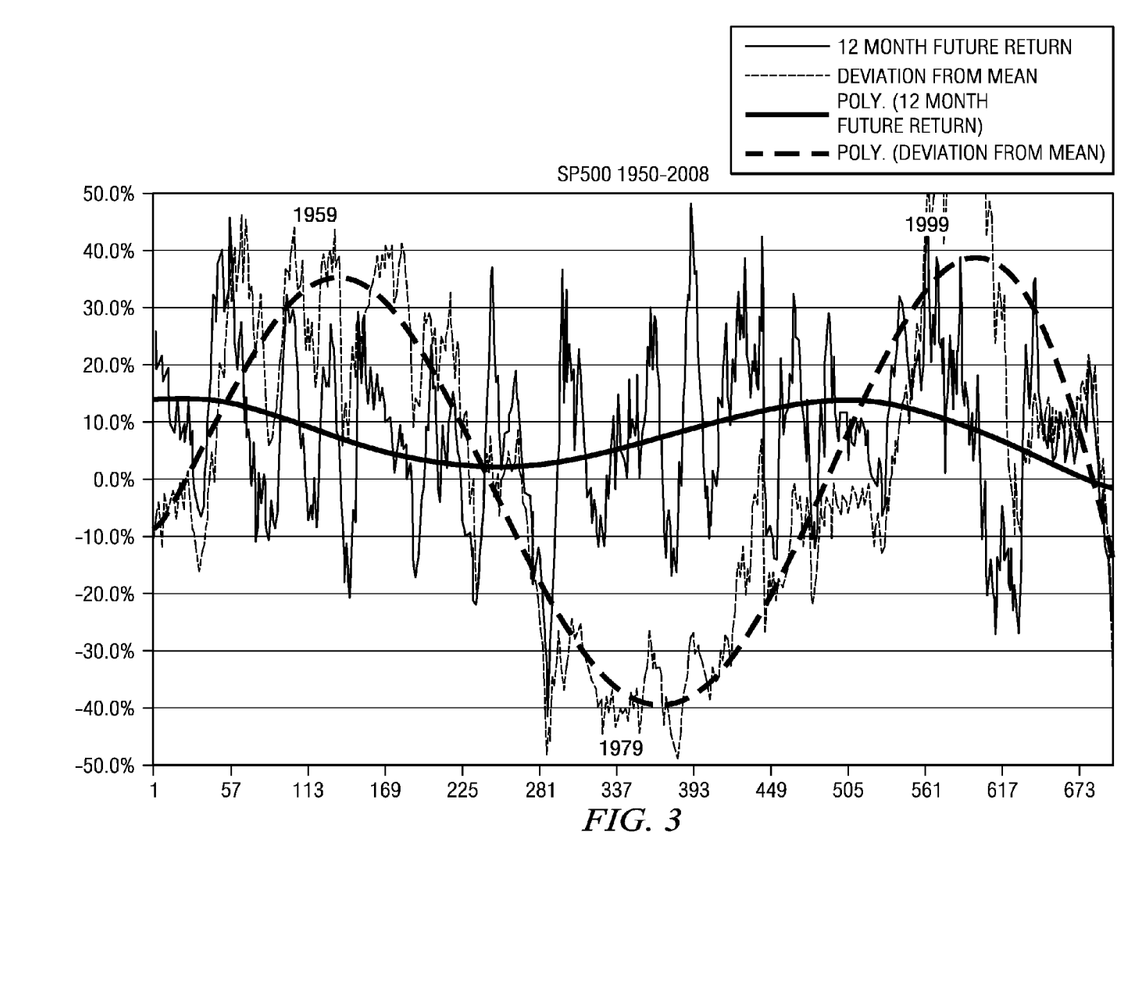
FIG. 3 is a graph illustrating mean deviation as a leading indicator of future returns.
Figure 4:
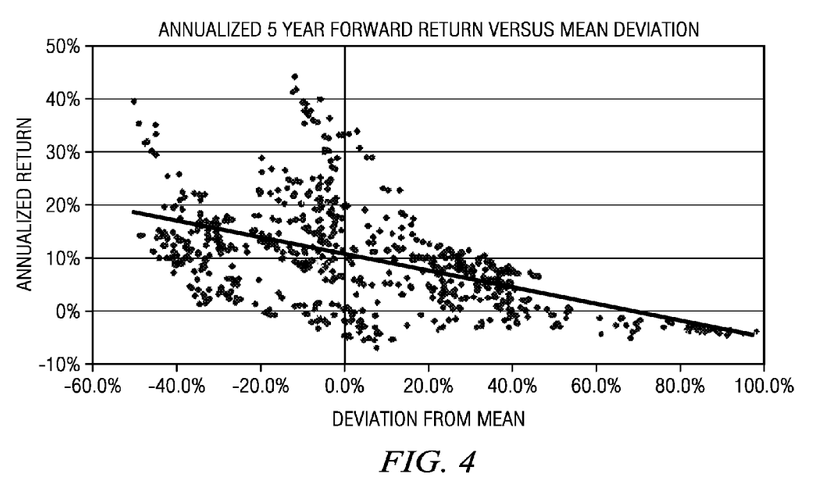
FIG. 4 is a scatter plot of mean deviation as a predictor of future returns.

A technical surrogate for the more fundamental metric of PE ratio, is the mean deviation of the price as illustrated in FIG. 3 (mean deviation as a leading indicator of future returns) and FIG. 4 (scatter plot of mean deviation as a predictor of future returns).

Modern Portfolio Theory

Modern Portfolio Theory (MPT) has supporters and critics. In brief, it is a theory predicated on diversification as a means of reducing volatility. To that end it is a reasonable and fundamental approach to building portfolios that reduce market fluctuations by constructing them of multiple uncorrelated (or better, negatively correlated) assets. Invariably those relationships are viewed as historical and static and are not particularly forward looking. The assumption is that historical performance will reflect future performance and that the relationships of the past will continue into the future. Furthermore, in an effort to quench volatility one must typically sacrifice return. In the classical view, by maximizing the Sharpe ratio one can maximize risk adjusted returns. But that is a backward looking view and does not necessarily represent an optimal forward looking strategy.

Dynamic Asset allocation

An extension to MPT is the concept of dynamic or active asset allocation that weights the uncorrelated or negatively correlated asset classes based on historical norms of the market as it moves through different phases and rotates from one favored asset class to another. This is especially relevant as major market dislocations occur which become guide posts for those sector rotations that have been observed in the past.

Efficient Market Theory

John Keynes, the influential British economist, once said, "The market can stay irrational longer than you can stay solvent," and it is an observation that is equally true today. This observation refers to the fact that the markets are not always rational and therefore there are times when the market undervalues companies and overvalues companies. This goes to the heart of the Efficient Market Theory (EMT) which assumes that prices in the market efficiently represent the true underlying values. MPT assumes an efficient market. But Keynes' observation would imply that markets are not efficient. In the short run, markets appear very inefficient, leading to bubbles and crashes. In the long run as markets and sectors correct for irrational behavior and revert to their mean they appear far more efficient. Fundamental analysis is a powerful analytical tool, but it may not optimally deal with inefficient markets.

SUMMARY

In one aspect, an adaptive closed loop decision engine outputs actionable alerts regarding asset holdings and allocations to reduce investment volatility and improve returns over market and sector cycles without unnecessary trading activity. The decision engine performs a statistical analysis on pricing trends that generates threshold decision points for investing in or avoiding assets and for determining asset allocation weightings within a portfolio. The engine operates in a way that yields higher returns, dramatically reduces maximum drawdown and lower volatility over market cycles. It identifies conditional probabilities, when they exist, to establish decision parameters that are applied to individual investment vehicles or to portfolios of investments. If asset pricing were a purely random event, then no conditional probability advantage would exist to yield a statistical benefit. However, historical data and empirical evidence indicate that for broad market indices and many investable assets (e.g., funds and ETFs) pricing variability deviates from a purely random (Gaussian) nature. Specifically, some trends have a higher probability of continuing for some period of time. Furthermore, these conditional relationships can be detected and used to establish decision parameters that can improve asset returns and lower volatility over single and multiple market corrections. Any conditional relationship that has existed in the past may not continue into the future and this invention is able to detect if those relationships are changing and adapt to those changes. The recent market turbulence has highlighted the need to have a well-developed statistical model of the market and an adaptive tool to deal objectively with such volatile situations.

In one aspect, a computer-implemented method of determining a state value of an asset utilizes a trend engine to: (a) access a database to determine the price of the asset at intervals within a predetermined period, (b) determine a weighted average of a long and short term moving average of the price of the asset, (c) determine a first differential of the weighted average of the long and short term moving average of the price of the asset, (d) determine the first differential of the weighted average of the long and short term moving averages of the price of the asset, (d) compare the first differential of the weighted average of the long and short term moving averages of the price of the asset to a predetermined threshold value to determine if the first differential exceeds the threshold, (e) determine a state value for the asset based upon whether the first differential of the weighted average of the long and short term moving averages of the price of the asset exceeds the threshold and wherein the state value is "in" indicating (1) that the asset should be purchased or held, or "out" indicating (2) that the asset should be sold and, provide an output of the state value.

The method may further include the step of utilizing historical data to determine an optimal threshold value corresponding to a maximized annual compounded growth rate. In different embodiments, the method may require the first differential of the weighted average to fall below the predetermined threshold value on multiple instances within a predetermined stabilization period before the state value of the asset is changed. Historical data may be used in an iterative process to determine an optimal stabilization period corresponding to a maximized annual compounded growth rate. The method may use a weighting factor to weight the long and short term moving averages of the price of the asset. Historical data may be used to determine an optimal weighting factor corresponding to a maximized annual compounded growth rate.

In another aspect, a method of determining an allocation of assets within a portfolio of assets includes the steps of selecting a pair of assets, A and B, to be compared. The first differential or derivative of the weighted averages of long and short term moving averages of the prices of assets A and B are determined. The first differentials, SA and SB, of the weighted average of the long and short term moving average of the price of assets A and B are determined. A loop threshold value Z is selected or determined and SA is compared to the sum of SB and Z. If SA is greater than the sum of SB and Z, a determination is made as to whether increasing the amount of asset A in the portfolio, relative to asset B, results in a maximum value for compounded annual growth rate based upon historical data. If so, an output is generated indicating that the amount of asset A in the portfolio should be increased relative to the amount of asset B held in the portfolio. Historical price data for assets A and B may be utilized to determine an optimal loop threshold value Z corresponding to a maximized annual compounded growth rate. A predetermined stabilization period may be incorporated into the method whereby the first differential of the weighted average of asset A must exceed the sum of SB and Z on multiple instances within the stabilization period before an output indicating that the amount of asset A in the portfolio should be increased relative to the amount of asset B held in the portfolio is generated. The length of the stabilization period may be optimized using historical data to determine a stabilization period corresponding to a maximized annual compounded growth rate.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of an adaptive closed loop investment decision engine are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Conditional Relationships

The goal of the methods disclosed herein is to discover, track and apply conditional relationships in asset pricing that can be used to raise the probability of achieving lower volatility and higher returns over market cycles and sector rotations. This invention detects trends in an asset's price and finds thresholds in these trends that exhibit a conditional probability of greater than 50% that the trend will continue. If an asset's pricing were a purely random variable this would not be possible. But it has been observed over a very broad set of asset classes and market indices that their pricing behavior is not purely random and that certain conditional relationships can be detected. These conditional relationships are neither static nor noiseless and may reflect the underlying psychological drivers in our inefficient markets. It is difficult to associate this behavior with any causal relationship. By using the analytical engines and methods disclosed herein these conditional relationships may be exploited to gradually improve returns and lower volatility as the market or asset moves through its inevitable cycles.

The First Derivative Conditional Relationship

Figure 5:
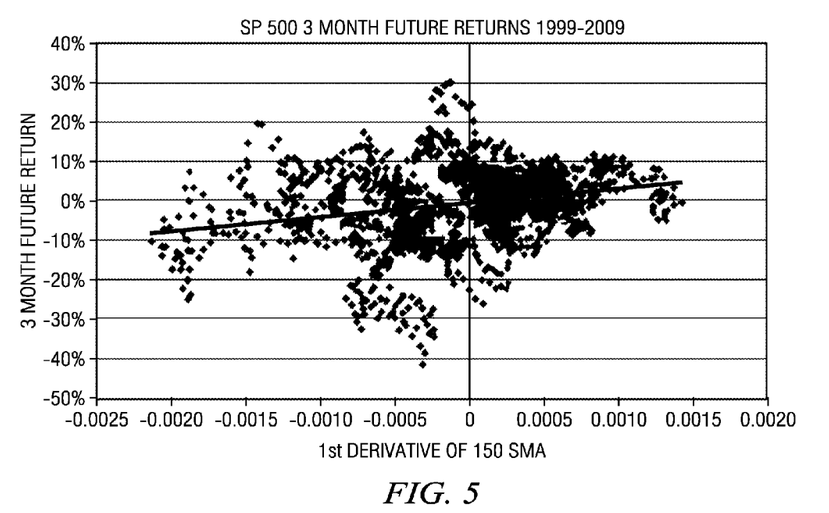
FIG. 5 is a scatter plot of the first derivative of the price of an asset to its near term continuation.

FIG. 5 illustrates a potential conditional relationship that can be exploited. It is a scatter plot of the first derivative of the price of an asset (the SP500 index) to its near term continuation. The linear best fit positive slope to this array of points can be viewed subjectively as follows: When an asset's price is increasing or decreasing over a given window of time, it has a slightly higher probability of continuing along that path for some period going forward. The greater the slope, the stronger the relationship; the narrower the distribution of points, the higher the conditional probability.

The Mean Deviation Conditional Relationship

Figure 6:
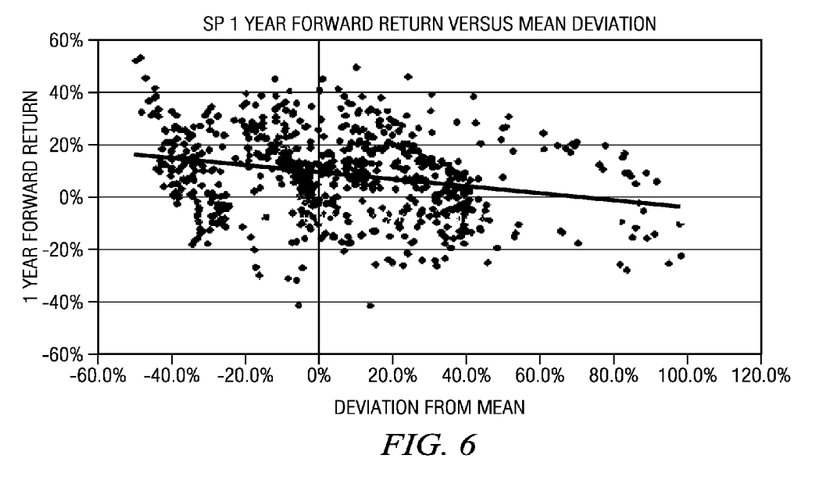
FIG. 6 is a scatter plot of one year returns as a function of mean deviation.

Similarly, but over a longer period of time the mean reverting nature of the market can be used to develop a conditional metric as illustrated in FIG. 6, a scatter plot of 1 year future returns as a function of mean deviation.

Probability Distribution

Similarly, but over a longer period of time the mean reverting nature of the market can be used to develop a conditional metric as illustrated in FIG. 6, a scatter plot of 1 year future returns as a function of mean deviation.

Figure 7:
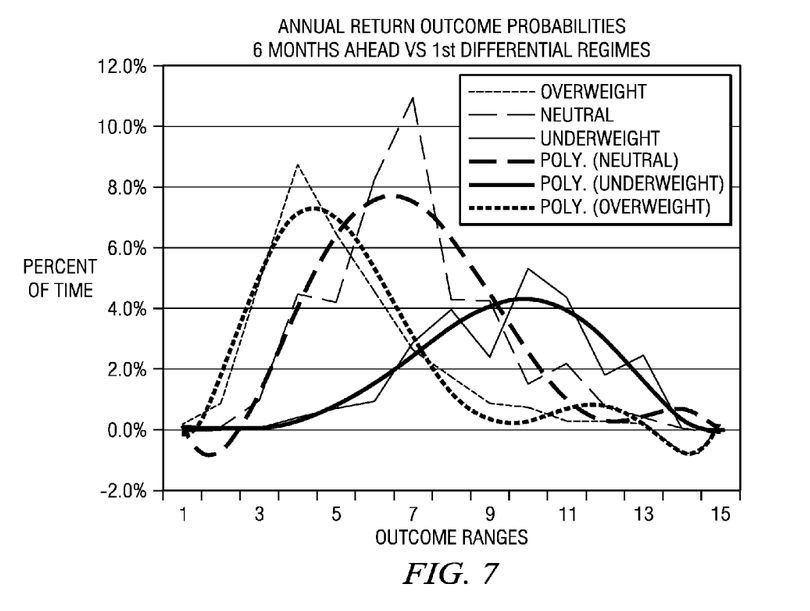
FIG. 7 is a graph illustrating probability distributions of future returns.
Figure 8:
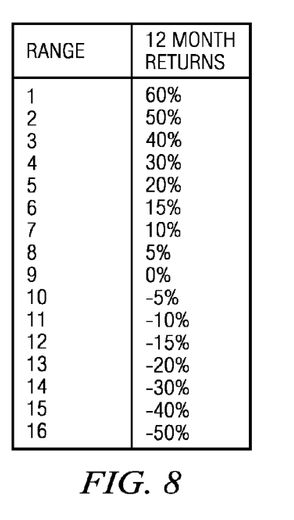
FIG. 8 is a table of outcome ranges corresponding to the ranges illustrated in FIG. 7.

When the above relationships exist, they can be used to identify improved regimes of performance. For example, when grouping the first derivative into three regimes of higher, neutral and lower probability and then observing those near term future return probability distributions it illustrates the opportunity. This is shown in FIG. 7 below, which also uses the SP 500 index. The outcome ranges of the X axis of FIG. 7 are listed in the table (FIG. 8) below:

| Range | 12 month Returns |
|---|---|
| 1 | 60% |
| 2 | 50% |
| 3 | 40% |
| 4 | 30% |
| 5 | 20% |
| 6 | 15% |
| 7 | 10% |
| 8 | 5% |
| 9 | 0% |
| 10 | −5% |
| 11 | −10% |
| 12 | −15% |
| 13 | −20% |
| 14 | −30% |
| 15 | −40% |
| 16 | −50% |

Outcome ranges corresponding to X axis ranges in FIG. 7

The Trend Engine

The trend engine establishes an investment "state" for an asset based on a "trend": To be invested (asset is rising greater than cash), to be in cash (asset is falling) or to be in one of those states but near a pending state change (stability period). The intent is to stay invested, but go to cash during periods of statistically non-normal market/asset corrections. As used herein, the term "asset" encompasses, for example, publicly traded stocks, mutual funds, bonds, Exchange Traded Funds (ETFs) and the like.

The trend engine seeks to find a conditional probability that for any given asset there is a greater likelihood that a particular trend will continue. The trend may be an up or down trend that has persisted for some period and will continue. The optimal parameters of the trend are determined by continuously testing those parameters against the entire price history of an asset. The optimal parameters are adjusted to accommodate shifts in the performance of the asset.

The output of the trend engine is the asset's state (in, out, or, pending). The process, as a practical benefit to the user, outputs the effective pricing record of the assets performance as generated by the trend engine state changes if it were applied with those parameters over the entire pricing history of the asset. This is used to build a comparative value profile for the trend model strategy versus a "buy and hold" strategy on a historical basis.

The key metric is the first differential of a compound weighted moving average of the asset pricing. This is used to detect significant negative trends. The state decision is made by comparing the current value of the first differential of a compound variable weighting moving average to a variable threshold that is composed of a fixed threshold adjusted by a scaled mean reversion offset and bound by minimum and maximum values. In addition, a hysteresis value and stability window enhance the performance of this metric while lowering trade activity by eliminating false positives, long range statistically insignificant trends and naturally occurring signal noise in the moving average (it should be noted that the inherent "signal" noise is substantially lower for a moving average rather than any direct pricing signal as, is used in many momentum style methodologies).

Figure 9:
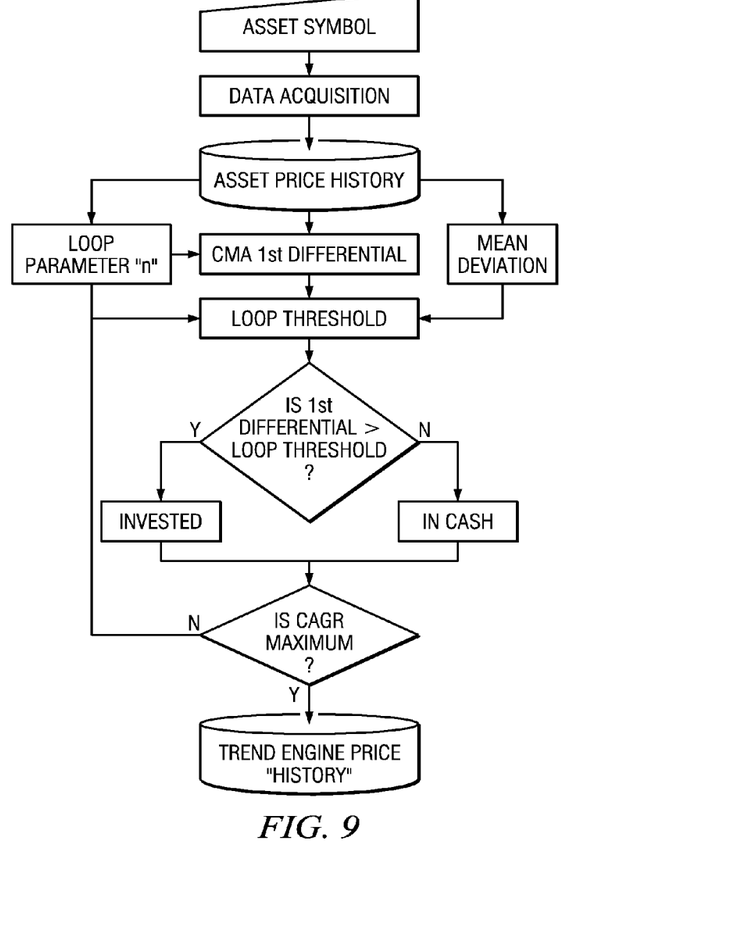
FIG. 9 is a flowchart illustrating logic for implementing a trend engine and determining optimal values for parameters according to a method disclosed herein.

FIG. 9 shows the flow diagram for determining optimal values for different parameters (n) used in the process. The process employs "n" multiple loops to find optimal values of parameters such as the weighted average (weighting factor X), and a stability window (Wa) through an iterative process that tests different values for the factors. Input to the process includes, for example, an asset symbol recent price history and long term, price history. Different values for the parameters are tested with the iterate process to find optimal values, e.g., values that correspond to a maximum Compound Annual Growth Rate (CAGR) based upon historical data. In one embodiment, a selected parameter such as weighting factor X is optimized and fixed at the optimum value, after which another parameter, such as Wa is optimized. The process may be repeated for multiple parameters to achieve values for the parameters that result in a maxim CAGR based upon historical data.

Referring still to FIG. 9, the input includes the daily adjusted closing price of an asset, V. The compound weighted moving average, CMA, is calculated from a weighted average of a long term and short term simple moving average where X is a weighting parameter. The time frames for the long and short term averages may be selected empirically based upon the likelihood that the times will encompass time ranges in which a statistical benefit may be realized, for example a fifty day moving average and a one hundred day moving average may be utilized. The compound moving average is computed as:

$$CMA=(X*SMA_L+SMA_S)/(1+X)$$

Where $SMA_L$ is the long term simple moving average, $SMA_S$ is the short term simple moving average and X is the weighting factor discussed above.

The mean deviation parameter $M_d$, is used as an offset to the threshold $T_s$. An optimal threshold value $T_s$ may be determined using the logic illustrated in FIG. 9 in an iterative process using historical data that results in a maximum compound annual growth rate. The threshold may be adjusted based upon new data and mean deviation. The mean deviation is normalized to avoid scale bias. The normalized first differential of the moving average, S is compared to the threshold. The comparator then determines if the asset state will be "invested" ("in") or cash ("out") based on the formula below where T is an optimized threshold and C is a scaling factor. The factor C is an empirically determined factor that tends to dampen the effect of mean deviation error on the threshold.

$$S>T+C*M_d$$

Where S is the normalized first differential of the moving average for the day the model is applied. If $S>T+C*M_d$ the asset state is "in" if not, the asset state is "out." To prevent excessive trading, the stability factor, e.g., time window (Wa), requires the state of the asset to remain unchanged (stable) within the window before the state change output is allowed.

Figure 10:
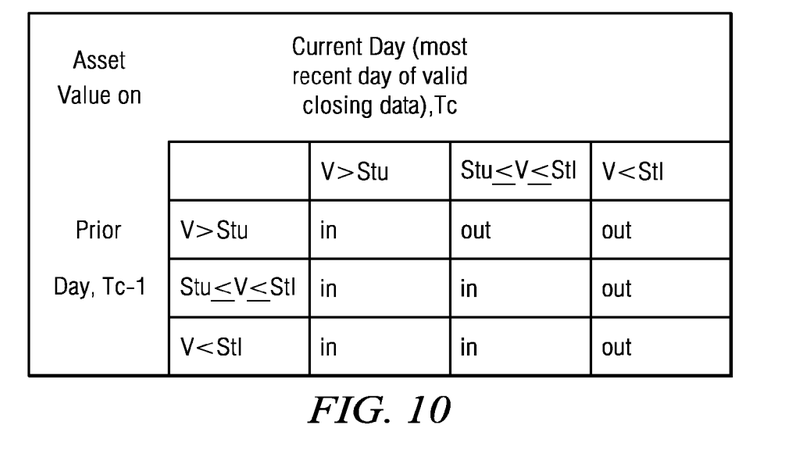
FIG. 10 is hysteresis logic table according to a method disclosed herein.

A hysteresis parameter may be applied based on the logic table in FIG. 10 below. The factor is defined by the hysteresis logic table (FIG. 10) below:

| Hysteresis logic table | | | | |
|---|---|---|---|---|
| | | Current Day (most recent day of valid closing data), Tc | | |
| | | V > Stu | Stu ≤ V ≤ Stl | V < Stl |
| Asset Value on Prior Day, Tc-1 | V > Stu | in | out | out |
| | Stu ≤ V ≤ Stl | in | in | out |
| | V < Stl | in | in | out |

Where, $$S_{tu}=T+C*M_d$$

$$S_{tl}=S_{tu}-H$$

Where $S_{tu}$ is an upper threshold, $S_{tl}$ is a lower threshold value and H is an empirically selected factor that may be optimized as one of the "n" parameters using the logic illustrated in FIG. 9.

An additional aspect of the process is achieved by applying a stability parameter, Wa that optimizes a tradeoff between performance and trading activity. Wa is a time "window" that requires that once an "in to out" or "out to in" transition is indicated, the new in or out state of the asset must remain unchanged (stable) within the window before the state change output is allowed.

Other values including mean reversion, and base threshold parameters may be tested and optimized in the process. The closed loops are continuously updated and optimized for each asset; the engine adapts to changing statistics of the underlying assets and allows for differing statistics from asset to asset. The iterative process illustrated in FIG. 9 may be used to determine values of T, C, Stu, and H (Stl) and Wa) that maximize the return over a predetermined period of time from T1 to T2 based on historical data.

Rotation Engine

The Rotation Engine applies a statistical model to individual assets within a portfolio to find an optimal set of asset weightings that have an improved probability to yield higher returns, lower volatility and lower maximum draw-downs for the portfolio. The Rotation Engine uses a similar closed loop statistical approach as the Trend Engine. But rather than determining whether an asset's return is greater than cash over the conditional probability time frame, it compares assets to one another after they have been filtered by the Trend Engine. It determines whether the assets are poorly correlated, or are negatively correlated in such a way as to make them historical complements, in that as one asset tends to increase, while its complement tends to decrease in such a way as to improve the pair's performance.

The Rotation Engine then uses the threshold values established in a closed loop process to determine when to overweight and when to underweight an asset in the pair or in an overall ranking of all assets in the portfolio. When this discipline is applied to all assets in a portfolio, the return is improved, volatility is lowered and maximum draw-down is reduced. The steps involved are to first find the relative performance of all asset pair combinations in the portfolio. This is accomplished by applying the logic shown in the flow diagram of FIG. 11.

Figure 11:
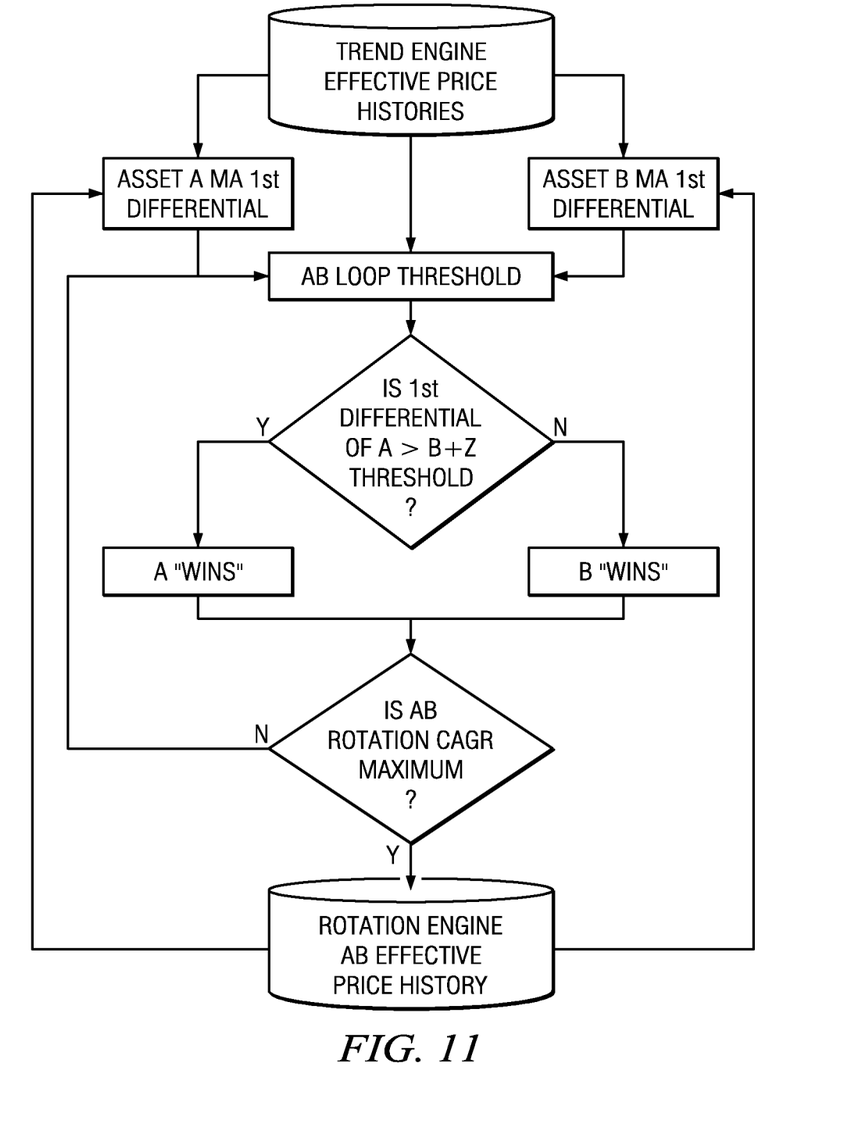
FIG. 11 is a flowchart illustrating computer logic for implementing a rotation engine according to a method disclosed herein.

For an asset pair (A,B), the first differential of the slope of a weighted moving average of each asset, SA and SB, is determined, a loop threshold Z is applied and the values are compared:

$$SA>SB+Z$$

Where Z is an empirically determined value that may be optimized using the logic illustrated in FIG. 11 along with historical data to iteratively determine a value for Z that results in a maximized. Compound Annual Growth Rate (CAGR).

As illustrated, a value of SA greater than SB+Z indicates an overweight position in asset A and an underweight position in asset B when CAGR is maximized. The data used in the process may be updated regularly to "track" real-time changes in statistics or optimal asset pairs. Additional loop parameters as used in the Trend Engine such as hysteresis and stability window may be used to enhance the performance of the Rotation Engine while lowering rebalancing activity by eliminating false positives and long range statistically insignificant trends.

Figure 12:
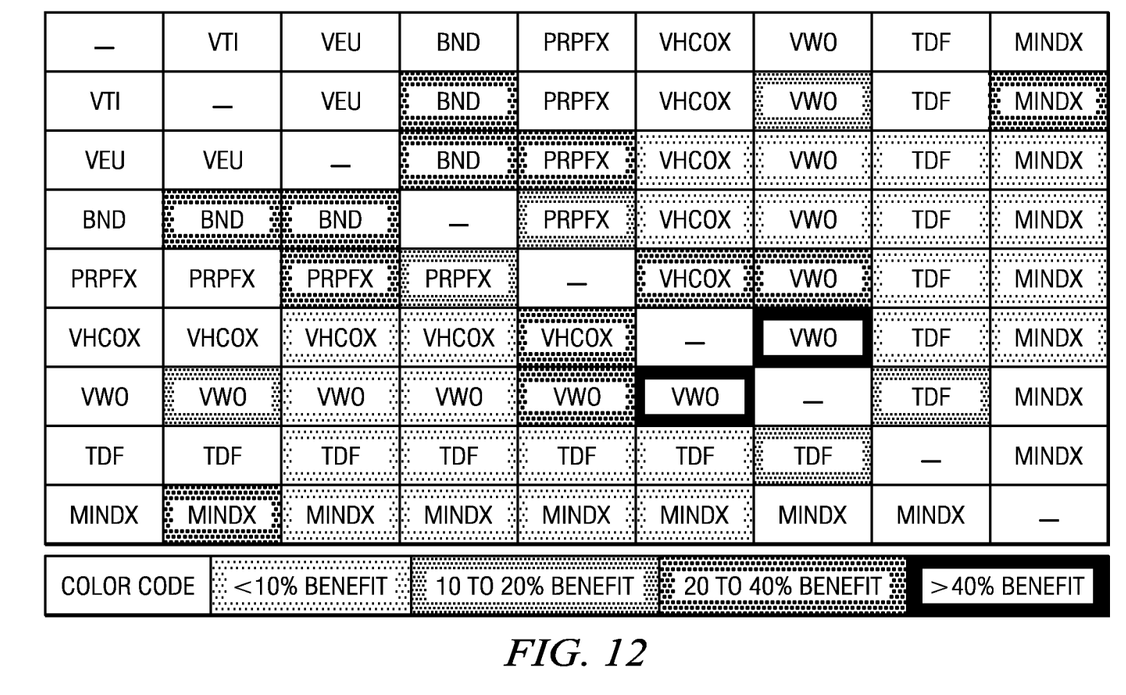
FIG. 12 is a table illustrating a rotation matrix indicating the weighting attached to assets in a portfolio according to a method disclosed herein.

The output of the Rotation Engine may be displayed in a "rotation matrix" that shows, among other things, the extent to which an asset is complimentary to another asset. FIG. 12 shows an example of such a rotation matrix. The rotation matrix represents a rapid visual guide indicating which assets in a portfolio should be currently over weighted and which should be under weighted and to what degree that asset's historical record indicates it has benefited from overweighting or underweighting.

There are at least two ways of applying the output of the logic illustrated in the flow diagram of FIG. 11 to improving portfolio performance. One is to pair asset combinations into those pairs yielding the greatest improvement (historical asset complements) and then overweight or underweight those assets in the pair according to their current state based on the closed loop threshold results. A second method is to rank asset weighting based on the total number of current asset pair "winnings" when all output pair combination current winnings are summed.

The current weighting ratio of the two assets in a pair is determined by the current winning asset in the pair and the aggressiveness of the investor. A minimum aggressiveness setting would result in an equal weighting of the two assets. A maximum aggressiveness setting would result in the winning asset receiving a 100% weighting, e.g., the value assigned to the pair would be allocated entirely to the winning asset. This approach has the benefit of retaining user-set weighting preferences in establishing the dynamic weightings indicators of the rotation engine. The total weight of the asset pair can be held to the original share count or periodically rebalanced to maintain the pair's total weight in the portfolio to the original settings.

The second approach ranks the assets weight proportional to the assets' wins and the aggressiveness of the investor. The distribution of the weightings from highest to lowest is more highly skewed for the greater aggressiveness of the investor. However, this approach may generate a rank that may modify or completely override an investor's weightings.

Figure 13:
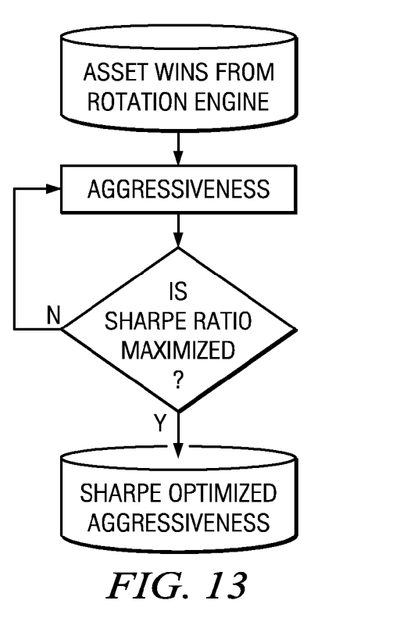
FIG. 13 is a flowchart illustrating logic for adjusting aggressiveness of asset allocation to maximize the Sharpe ratio of a portfolio of assets.

Once the asset weightings that yield the maximum portfolio return are determined an additional loop illustrated in the flow chart of FIG. 13 can be applied to find the optimal value of aggressiveness that maximizes the Sharpe ratio of a portfolio. The Sharpe ratio is a well known risk adjusted return metric and is basically the risk adjusted return divided by the volatility of an asset or portfolio. The logic is shown in the flow chart of FIG. 13, which illustrates Sharpe optimized aggressiveness logic. As illustrated the level of aggressiveness is adjusted to until the Sharpe ratio is maximized. The Sharpe ratio often will sacrifice return for lowering volatility. However, applying this logic to a post rotation engine process ensures that return has been maximized prior to optimizing for risk adjusted returns.

Figure 14:
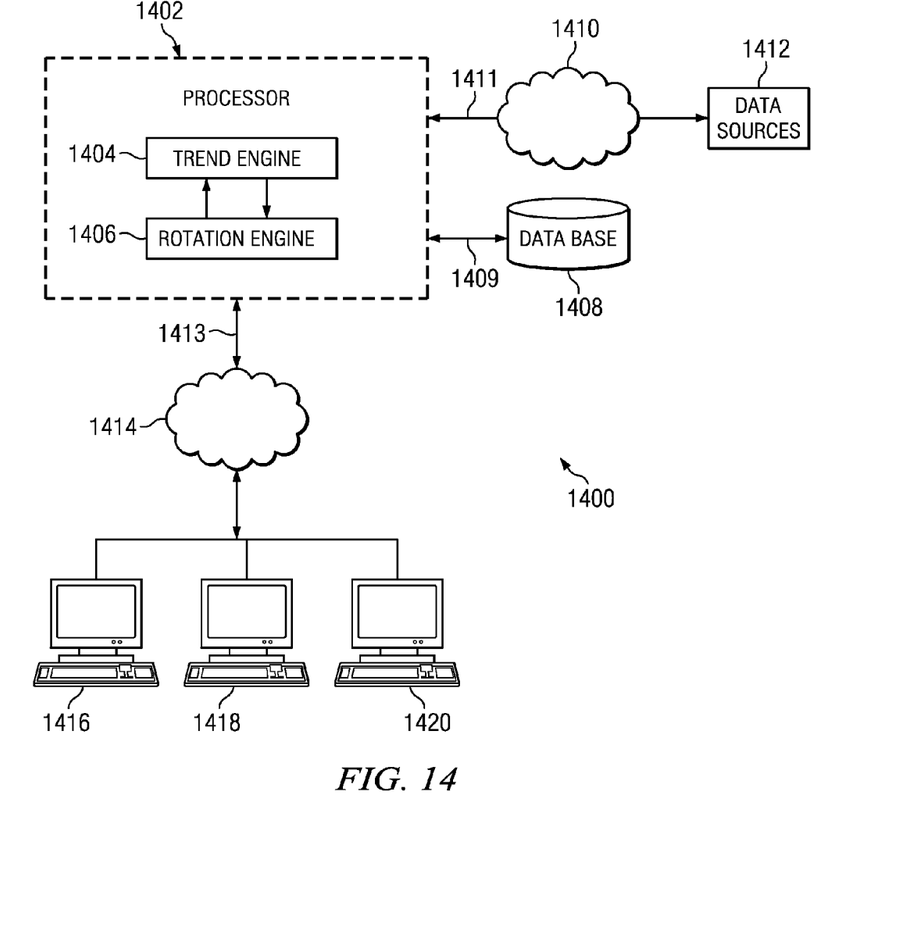
FIG. 14 is a block diagram illustrating a system for implementing methods disclosed herein.

Turning to FIG. 14 a system 1400 for implementing the computer-based methods disclosed herein is illustrated. In one embodiment, system 1400 comprises one or more processors or CPUs 1402. Processor 1402 is configured to implement Trend Engine 1404 and Rotation Engine 1406. Trend Engine 1404 and Rotation Engine 1406 include the hardware and software necessary to perform the steps illustrated in FIGS. 9 and 11, respectively. A database 1408 operatively connected to processor 1402 may include the algorithms necessary to perform the steps along with data, for example historical price data of an asset or the results of prior calculations, used in the method. A data transmission interface 1409 is provided between processor 1402 and database 1408 to enable processor 1402 to access programs and data stored on the database.

System 1400 may also include a data transmission interface 1411 between processor 1402 and external data sources, enabling processor 1402 to query the data sources to obtain relevant information, for example current price data for selected assets. Access to external data sources may be by means of a hardwired connection or through a private or public network 1410 such as the Internet. A data transmission interface 1413 is provided to allow a system administrator 1416 and users 1418, 1420 to access processor 1402 to utilize Trend Engine 1402 and Rotation Engine 1406. Data transmission interface 1413 may be the same or different from interface 1411, and may utilize a private or public network 1410 such as the Internet.

It will be appreciated by those skilled in the art having the benefit of this disclosure that this adaptive closed loop investment decision engine provides a system and method for actionable alerts regarding asset holdings and allocations to reduce investment volatility and improve returns over market and sector cycles. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A computer-implemented method of determining an allocation of assets within a portfolio of assets, comprising:
   a) selecting a pair of assets, A and B, to be compared, wherein the assets A and B can be two different types of assets that are negatively correlated;
   b) determining, by a computer system, the first differential SA of the weighted average of the long and short term moving average of the price of asset A;
   c) determining, by the computer system, the first differential SB of the weighted average of the long and short term moving average of the price of asset B;
   d) determining, by the computer system, a loop threshold value Z;
   e) comparing, by the computer system, SA to the sum of SB and Z;
   f) if SA is greater than the sum of SB and Z, determining, by the computer system, if increasing the amount of asset A relative to asset B in the portfolio results in a maximum value for compounded annual growth rate based upon historical data and, if so;
   g) generating, by the computer system, an output indicating that the amount of asset A in the portfolio should be increased relative to the amount of asset B held in the portfolio.

2. The method of claim 1 further comprising the step of utilizing historical data to determine an optimal loop threshold value Z corresponding to a maximized annual compounded growth rate.

3. The method of claim 1 further comprising requiring the first differential of the weighted average of asset A to exceed the sum of SB and Z on multiple instances within a predetermined stabilization period before generating an output indicating that the amount of asset A in the portfolio should be increased relative to the amount of asset B held in the portfolio.

4. The method of claim 3 further comprising utilizing historical data to determine an optimal stabilization period corresponding to a maximized annual compounded growth rate.

5. The method of claim 1 wherein the portfolio contains a plurality of assets including asset A and asset B, and wherein the method repeats in order to calculate a relative performance output for all possible asset pair combinations in the portfolio.

6. The method of claim 5 further comprising applying the relative performance outputs to the portfolio, wherein the applying includes:
   identifying asset pair combinations that are historical asset complements; and
   either overweighting or underweighting each asset in an identified asset pair combination according to a current state of that asset as represented in the relative performance output for that asset pair combination.

7. The method of claim 6 further comprising applying an aggressiveness setting to the weighting of a winning asset in an identified asset pair, wherein a minimum aggressiveness setting results in an equal weighting of the assets in the identified asset pair combination, and wherein a maximum aggressiveness setting results in the winning asset receiving one hundred percent of the weighting of the identified asset pair combination.

8. The method of claim 1 further comprising applying the relative performance outputs to the portfolio, wherein the applying includes ranking each asset weighting based on a total number of asset pair winnings when all asset pair current winnings are summed.

9. The method of claim 8 further comprising applying an aggressiveness setting to the weighting of an asset, wherein a higher aggressiveness setting results in an increasingly skewed distribution for an asset compared to a lower aggressiveness setting.

* * * * *